United States Patent
Fujiwara et al.

(10) Patent No.: US 9,553,874 B2
(45) Date of Patent: Jan. 24, 2017

(54) PROGRAMMABLE DISPLAY APPARATUS, CONTROL METHOD, AND PROGRAM WITH FACIAL AUTHENTICATION

(71) Applicant: OMRON Corporation, Kyoto-shi, Kyoto (JP)

(72) Inventors: Kiyotaka Fujiwara, Kyoto (JP); Takayoshi Yamashita, Kasugai (JP); Fumio Kawakami, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 30 days.

(21) Appl. No.: 14/338,376

(22) Filed: Jul. 23, 2014

(65) Prior Publication Data

US 2015/0033309 A1    Jan. 29, 2015

(30) Foreign Application Priority Data

Jul. 29, 2013 (JP) ................. 2013-156681

(51) Int. Cl.
*H04L 29/06* (2006.01)
*G06F 21/32* (2013.01)
*G06K 9/00* (2006.01)

(52) U.S. Cl.
CPC ........... *H04L 63/0861* (2013.01); *G06F 21/32* (2013.01); *G06K 9/00288* (2013.01)

(58) Field of Classification Search
CPC ... H04L 63/0861; G06F 21/32; G06K 9/00288
See application file for complete search history.

(56) References Cited

U.S. PATENT DOCUMENTS

| 6,111,517 A * | 8/2000 | Atick ...................... G06F 21/32 340/5.83 |
| 7,120,278 B2 * | 10/2006 | Sukegawa ............ G06K 9/6255 348/152 |
| 8,154,615 B2 | 4/2012 | Fedorovskaya et al. |

(Continued)

FOREIGN PATENT DOCUMENTS

| CN | 101499012 A | 8/2009 |
| CN | 102033727 A | 4/2011 |

(Continued)

OTHER PUBLICATIONS

European Search Report dated Oct. 30, 2014.

(Continued)

*Primary Examiner* — William Goodchild
(74) *Attorney, Agent, or Firm* — Mots Law, PLLC

(57) ABSTRACT

Provided is a programmable display apparatus that can permit access to an application through facial authentication, and can display a screen corresponding to an authenticated user after the access is permitted. The programmable display apparatus stores feature data of faces of a plurality of users and screen data for displaying a plurality of screens. The programmable display apparatus performs facial authentication based on image data of a user obtained through image capture and on the feature data. The programmable display apparatus permits a user to access the application if the user has been authenticated. Upon permitting the access, the programmable display apparatus displays, on a display, a screen corresponding to the authenticated user from among the plurality of screens.

15 Claims, 16 Drawing Sheets

(56) References Cited

U.S. PATENT DOCUMENTS

| | | | |
|---|---|---|---|
| 2004/0010724 A1* | 1/2004 | Brown | G06F 21/32 713/186 |
| 2009/0043210 A1* | 2/2009 | Kitoh | A61B 5/0059 600/476 |
| 2009/0178126 A1* | 7/2009 | Du | G06F 21/32 726/6 |
| 2010/0328492 A1 | 12/2010 | Fedorovskaya et al. | |
| 2011/0074540 A1 | 3/2011 | Chang | |
| 2012/0269405 A1* | 10/2012 | Kaneda | G06K 9/00604 382/118 |

FOREIGN PATENT DOCUMENTS

| | | |
|---|---|---|
| CN | 102473264 A | 5/2012 |
| JP | 2004-078687 A | 3/2004 |
| JP | 2008-112222 A | 5/2008 |
| JP | 2008-165353 A | 7/2008 |
| JP | 2011-059194 A | 3/2011 |

OTHER PUBLICATIONS

Shihong Lao et. al. Vision-Based Face Understanding Technologies and Their Applications, Field programmable Logic and Application, Jan. 1, 2004, pp. 339-348, Springer Berlin Heidelberg.

Tilen Mlakar et. al. Viewer authentication for personalized iTV services, Eighth International Workshop on Image Analysis for Multimedia Interactive Services, Jun. 1, 2006, pp. 63-63, WIAMIS.

Eljko Obrenovic et. al. Integrating User Customization and Authentication: The Identity Crisis, Security & Privacy, Sep. 1, 2012, pp. 82-85, vol. 10, No. 5, IEEE Service Center, Los Alamitos, CA, US.

* cited by examiner

FIG. 8

| Name | Role | Date of Update | Facial Image Data Feature Data | | |
|---|---|---|---|---|---|
| Yamashita Takeshi | Administrator | 2012/08/16 | 1023KD, 1023TD | 7544KD, 7544TD | 9118KD, 9118TD |
| Oliver Williams | Maintenance | 2013/01/31 | 2715KD, 2715TD | 4667KD, 4667TD | |
| Fujiwara Ichiro | Operator | 2013/04/01 | 5332KD, 5332TD | | |
| Takeda Sachiko | Operator | 2013/02/01 | 4991KD, 4991TD | | |

| Object | Coordinate Information | Administrator | Maintenance Personnel | Operator |
|---|---|---|---|---|
| Start Bottom | $(x_1, y_1, w_1, h_1)$ | Displayed | Displayed | Not Displayed |
| Stop Bottom | $(x_2, y_2, w_2, h_2)$ | Displayed | Displayed | Not Displayed |
| Pause Bottom | $(x_3, y_3, w_3, h_3)$ | Displayed | Displayed | Not Displayed |
| Admin Bottom | $(x_4, y_4, w_4, h_4)$ | Displayed | Not Displayed | Not Displayed |
| Graph | $(x_5, y_5, w_5, h_5)$ | Displayed | Displayed | Displayed |

FIG. 12

| Date/Time | Command | Name |
|---|---|---|
| 2013/04/16 10:00:00 | Log in | Yamashita Takeshi |
| 2013/04/16 10:00:30 | Push Start | Yamashita Takeshi |
| 2013/04/16 10:01:15 | Show Graph | Yamashita Takeshi |

| Date/Time | Image of Unregistered Person |
|---|---|
| 2013/04/14 16:10:15 | 90011NRD.jpg |
| 2013/04/16 10:02:25 | 90012NRD.jpg |
| 2013/04/19 12:25:30 | 90013NRD.jpg |

| Name | Role | Date of Update | Facial Image Data Feature Data | | | Age | Gender | Nationality | Handedness |
|---|---|---|---|---|---|---|---|---|---|
| Yamashita Takeshi | Administrator | 2012/08/16 | 1023KD, 1023TD | 7544KD, 7544TD | 9118KD, 9118TD | 45 | Male | Japan | Right |
| Oliver Williams | Maintenance | 2013/01/31 | 2715KD, 2715TD | 4667KD, 4667TD | | 38 | Female | UK | Right |
| Fujiwara Ichiro | Operator | 2013/04/01 | 5332KD, 5332TD | | | 28 | Male | Japan | Left |
| Takeda Sachiko | Operator | 2013/02/01 | 4991KD, 4991TD | | | 60 | Female | Japan | Right |

D9

PROGRAMMABLE DISPLAY APPARATUS, CONTROL METHOD, AND PROGRAM WITH FACIAL AUTHENTICATION

FIELD

The present invention relates to a programmable display apparatus, a display control method for a programmable display apparatus, and a program for controlling a programmable display apparatus.

BACKGROUND

Conventionally, a programmable display apparatus that is communicably connected to a programmable logic controller (PLC) is known. For example, JP 2008-112222A discloses a programmable display apparatus that includes an HMI processing unit and a face log processing unit. The face log processing unit includes a facial image database, a face detection unit, a shared memory, a face logging unit, a face log control unit, and a face log file. This programmable display apparatus is communicably connected to a camera.

When an operator performs a predetermined switch operation on a screen displayed on the programmable display apparatus, the HMI processing unit instructs the face log processing unit to execute processing for logging a facial image of the operator. Once the face log processing unit has received this instruction, the face detection unit detects a full-face image from among images of the operator captured by the camera, and stores the detected full-face image into a predetermined facial image database as a file. The face detection unit also writes a path name of the file in the facial image database to the shared memory together with information related to an operation history, such as the details of the switch operation, the date and time of face detection, and a screen number of the screen on which the switch operation was performed. The face log control unit instructs the face logging unit to store data written to the shared memory into the face log file.

Meanwhile, a facial authentication technique is conventionally known. For example, JP 2004-78687A discloses an entrance/exit management system that performs facial authentication. This entrance/exit management system manages entrance to and exit from a facility using a face cross-reference apparatus that cross-references whether or not an entering/exiting person is a pre-registered person based on a facial image of the entering/exiting person. In the entrance/exit management system, a surveillance camera that captures an image of an entering/exiting person is installed in the vicinity of the face cross-reference apparatus. The image from the surveillance camera is recorded into a recording unit, and transmitted to an entrance/exit management server together with an entrance/exit history, such as the result of cross-reference performed by the face cross-reference apparatus.

JP 2011-59194A discloses an image forming apparatus that includes an image capturing device, an operation screen control unit, and a display unit. The operation screen control unit includes a facial region detection unit, a movement determination unit, a facial feature extraction unit, an attribute detection unit, and a display control unit. The facial region detection unit detects a facial region of a user from image data captured by the image capturing device. The movement determination unit determines whether or not the user is approaching the image forming apparatus. If the movement determination unit determines that the user is approaching the image forming apparatus, the facial feature extraction unit extracts features of a face from the facial region. The attribute detection unit detects an attribute of the user based on the features of the face extracted by the facial feature extraction unit. The display control unit displays, on the display unit of the image forming apparatus, an operation screen corresponding to the attribute of the user detected by the attribute detection unit.

JP 2008-165353A discloses a surveillance system that monitors a person who operates a surveillance apparatus. This surveillance system includes an operator surveillance apparatus. The operator surveillance apparatus includes a camera, a facial image storage unit, and an operation authority identification unit. The camera captures a face of the operating person and outputs facial image data. Facial image data for cross-reference is pre-registered in the facial image storage unit together with a range of operation authorities. The operation authority identification unit identifies a range of operation authorities of the operating person by cross-referencing facial image data of the operating person, which is retrieved either periodically or each time an operation is performed, with the facial image data for cross-reference. The operation authority identification unit changes an operable range of the surveillance apparatus in accordance with the range of operation authorities.

JP 2008-112222A, JP 2004-78687A, JP 2011-59194A, and JP 2008-165353A are examples of background art.

The programmable display apparatus of JP 2008-112222A can leave the result of facial authentication as a history, but cannot permit access to an application using facial authentication. Permission of access to an application using facial authentication is neither disclosed nor suggested in JP 2004-78687A, JP 2011-59194A, and JP 2008-165353A.

JP 2011-59194A describes a configuration for detecting an attribute of a user. With this configuration, there is a possibility that different attributes are detected from the same person. Therefore, there is a possibility that different operation screens are displayed if the same person approaches the image forming apparatus at different timings.

While JP 2008-165353A discloses the change of the operable range in accordance with an operation authority of an operator, it does not disclose display of an operation screen corresponding to the operator. In particular, according to JP 2008-165353A, the same operation screen is always displayed if there are a plurality of persons who have the same operation authority.

SUMMARY

The invention of the present application has been made in view of the above problem. It is an object thereof to provide a programmable display apparatus that can permit access to an application through facial authentication and can display a screen corresponding to an authenticated user after the access is permitted, a display control method used in the programmable display apparatus, and a program for controlling the programmable display apparatus.

A programmable display apparatus according to one aspect of the invention controls access to an application. The programmable display apparatus includes: a display; a display control unit that displays a screen on the display; a storage unit that stores feature data of faces of a plurality of users and screen data for displaying a plurality of screens; an authentication unit that performs facial authentication based on image data of a user obtained through image capture and on the feature data; and an access control unit that permits a user to access the application if the user has been authenticated. Upon permitting the access, the access control unit lets the display control unit display on the display one of the plurality of screens that corresponds to the authenticated user from among.

It is preferable that the storage unit stores the feature data in form of a plurality of pieces of feature data. Identification information indicating an operation authority is stored in association with the individual pieces of feature data. The display control unit displays different screens on the display depending on the identification information.

It is preferable that the plurality of pieces of feature data are individually associated with information defining a display mode of a screen. The display control unit displays a screen corresponding to an identified individual on the display in a display mode defined by information associated with feature data of the identified individual.

It is preferable that the display mode includes at least one of a language and a character size. It is preferable that the information defining the display mode of the screen includes at least one of age, gender, and nationality.

A display control method according to another aspect of the invention controls display of a screen displayed on a display of a programmable display apparatus. The display control method includes: a step of receiving image data of a user obtained through image capture; a step of performing facial authentication of a user based on feature data indicating a feature of a face of an individual; a step of permitting access to an application that runs on the programmable display apparatus if a user has been authenticated through the facial authentication; and a step of displaying on the display a screen corresponding to the authenticated user from among a plurality of screens.

It is preferable that the display control method further includes: a step of storing the feature data in form of a plurality of pieces of feature data; a step of storing identification information indicating an operation authority in association with the individual pieces of feature data; and a step of displaying different screens on the display depending on the identification information.

It is preferable that the plurality of pieces of feature data are individually associated with information defining a display mode of a screen. The display control method further includes a step of displaying a screen corresponding to an identified individual on the display in a display mode defined by information associated with feature data of the identified individual.

It is preferable that the display mode includes at least one of a language and a character size. It is preferable that the information defining the display mode of the screen includes at least one of age, gender, and nationality.

A program according to still another aspect of the invention controls display of a screen displayed on a display of a programmable display apparatus. The program causes a processor of the programmable display apparatus to execute: a step of receiving image data of a user obtained through image capture; a step of performing facial authentication of a user based on feature data indicating a feature of a face of an individual; a step of permitting access to an application that runs on the programmable display apparatus if a user has been authenticated through the facial authentication; and a step of displaying on the display a screen corresponding to the authenticated user from among a plurality of screens.

The invention enables permission of access to the application through facial authentication, and enables display of a screen corresponding to an authenticated user after the access is permitted.

BRIEF DESCRIPTION OF THE DRAWINGS

FIG. 8 is a diagram illustrating data stored in a registered image DB.

FIG. 11 shows data D3 that is referred to when displaying user screens of FIGS. 10A to 10C.

FIG. 12 shows history data D5 managed by a management unit.

FIG. 13 shows data D7 stored in an unregistered person DB.

FIG. 16 is a diagram illustrating data that is stored in the registered image DB in place of the data D1 shown in FIG. 8.

DETAILED DESCRIPTION

Figure 1:
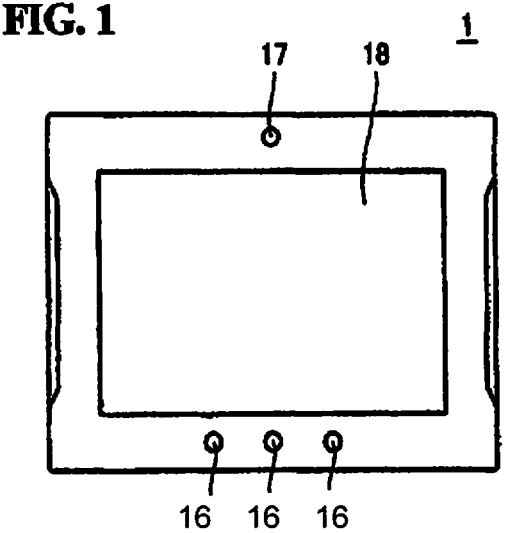
FIG. 1 is a front view of a display apparatus.

The following describes in detail a programmable display apparatus (hereinafter simply referred to as "display apparatus") according to an embodiment of the invention with reference to the drawings. It should be noted that elements in the drawings that are identical or equivalent to one another will be given the same reference numeral, and a description thereof will not be repeated.

<A. External Appearance>

FIG. 1 is a front view of a display apparatus 1 according to the present embodiment. The display apparatus 1 is connected to a PLC (programmable logic controller) during use, and functions as a human-machine interface (HMI) for the PLC. Referring to FIG. 1, the display apparatus 1 includes operation keys 16, a camera 17, and a touchscreen 18. The touchscreen 18 is composed of a display and a touchscreen panel.

<B. Outline of Processing>

The display apparatus 1 controls access to an application pre-stored in the display apparatus 1 through authentication using a facial image of a user. Specifically, the display apparatus 1 permits access to the application if the user has been authenticated. The following describes processing for permitting access to the application (that is to say, "login processing") as one example. The following also describes "editing processing" and "history recording processing" to outline the other main types of processing executed by the display apparatus 1.

Hereinafter, a "login state" denotes a state in which access to the application is permitted, and a "logout state" denotes a state in which access to the application is not permitted. The display apparatus 1 grants the right to access the application if access to the application is permitted, and cancels the right to access the application if access to the application is not permitted.

(b1. Login Processing)

Figure 2A:
FIGS. 2A and 2B are diagrams illustrating authentication processing of the display apparatus.
Figure 2A:
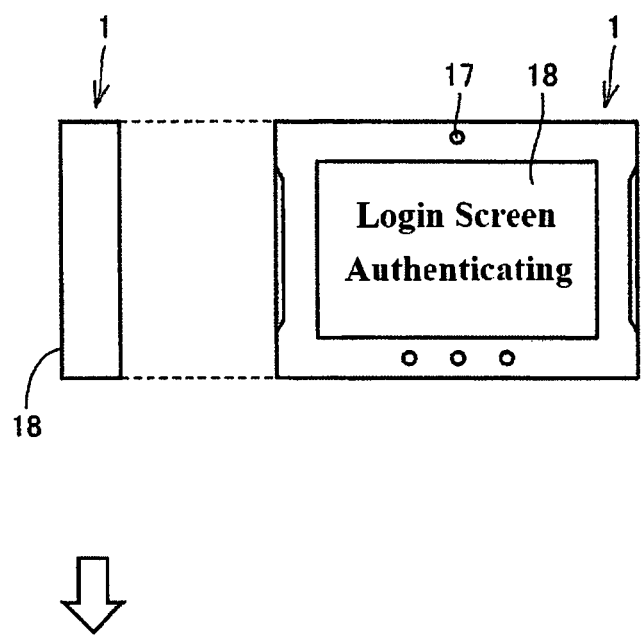
Figure 2B:
Figure 2B:
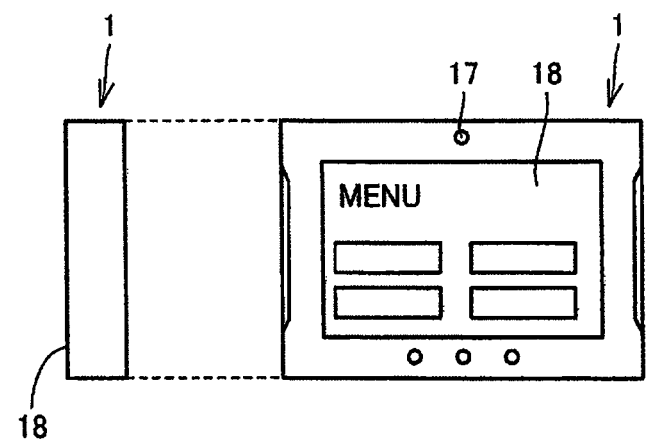

FIGS. 2A and 2B are diagrams illustrating authentication processing of the display apparatus 1. Referring to FIGS. 2A and 2B, when a person stands in front of the display apparatus 1 (facing the touchscreen 18), facial authentication is started based on image data of a subject (the person and background) obtained through image capture performed by the camera 17, and on feature data of faces of users pre-stored in the display apparatus 1. As facial authentication is a conventionally known technique, a detailed description thereof is not repeated herein.

If a user has been authenticated through facial authentication, the display apparatus 1 permits access to the application. That is to say, in the present embodiment, the display apparatus 1 permits an authenticated user to log in. Specifically, the display apparatus 1 makes a transition to a state in which access to data pre-stored in the display apparatus 1 is permitted. In other words, if the user has been authenticated through facial authentication (if the authentication has been successful), the state of the display apparatus 1 is switched from a logout state to a login state. Furthermore, upon switching to the login state, the display apparatus 1 displays a predetermined user screen on the display of the touchscreen 18. In this way, the display apparatus 1 enables login through facial authentication. It should be noted that a user screen is a screen on which a user performs operations and/or makes confirmations. The user screen may be an operation screen with operation buttons, or a screen without operation buttons.

(b2. Editing Processing)

Figure 3A:
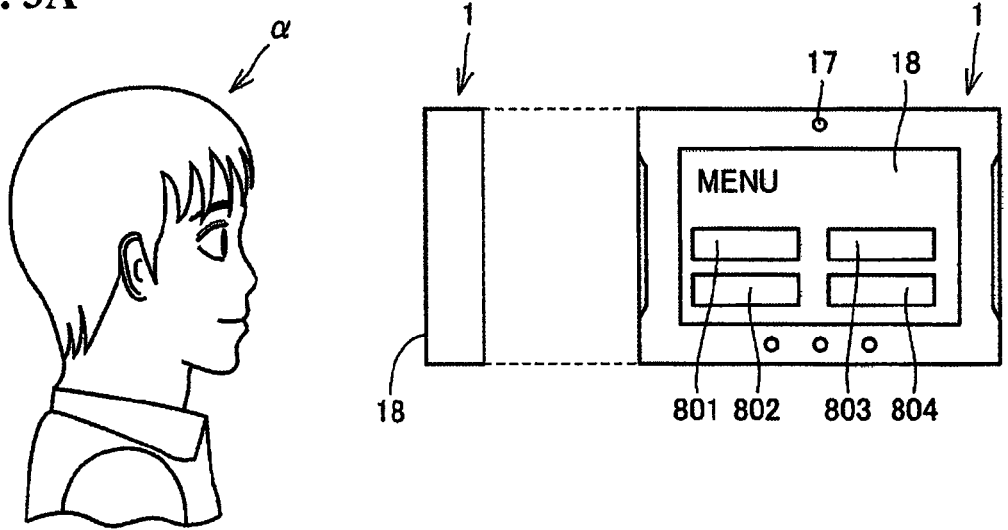
FIGS. 3A and 3B are diagrams illustrating examples of operation screens after a user has been authenticated through facial authentication.
Figure 3B:
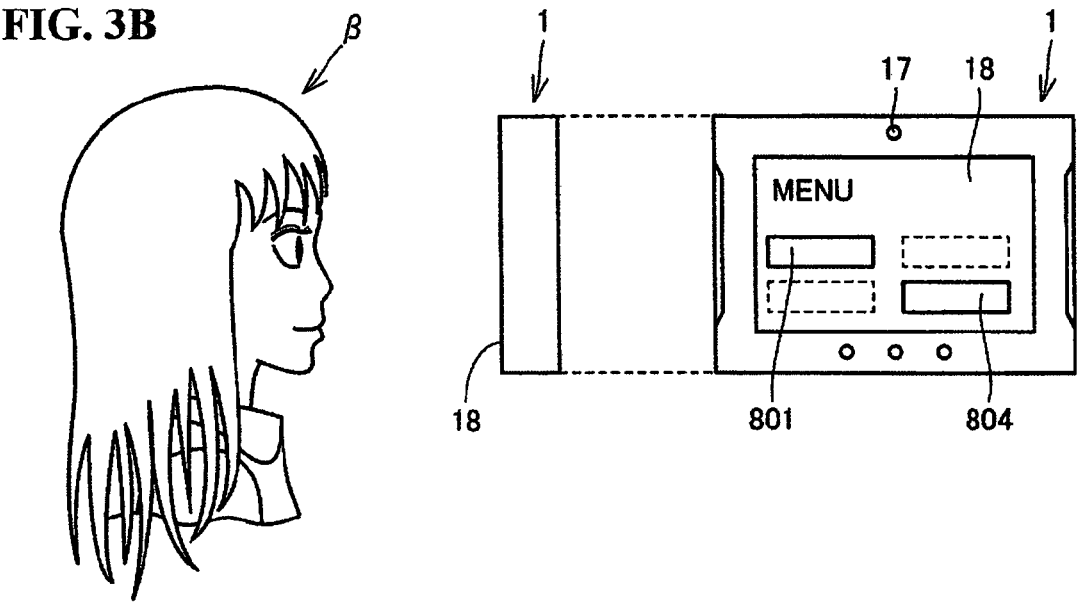

FIGS. 3A and 3B are diagrams illustrating examples of user screens after a user has been authenticated through facial authentication. FIG. 3A is a diagram illustrating a screen that is displayed on the display apparatus 1 if a user authenticated through facial authentication has been determined to be an administrator who has a higher operation authority over the application than a general operator (hereinafter, simply "operator"). FIG. 3B is a diagram illustrating a screen that is displayed by the display apparatus 1 if a user authenticated through facial authentication has been determined to be an operator.

Referring to FIGS. 3A and 3B, once access to the application has been permitted through facial authentication, the display apparatus 1 displays, on the display, a screen corresponding to the authenticated user from among a plurality of screens. For example, if a male α is the administrator, the display apparatus 1 displays a plurality of selectable objects 801, 802, 803, 804 on the display. On the other hand, if a female β is the operator, the display apparatus 1 does not display the objects 802, 803 corresponding to processing that is permitted only for the administrator (or displays them as unselectable objects). In this way, the display apparatus 1 can display a user screen corresponding to the authenticated user.

(b3. History Recording Processing)

Figure 4:
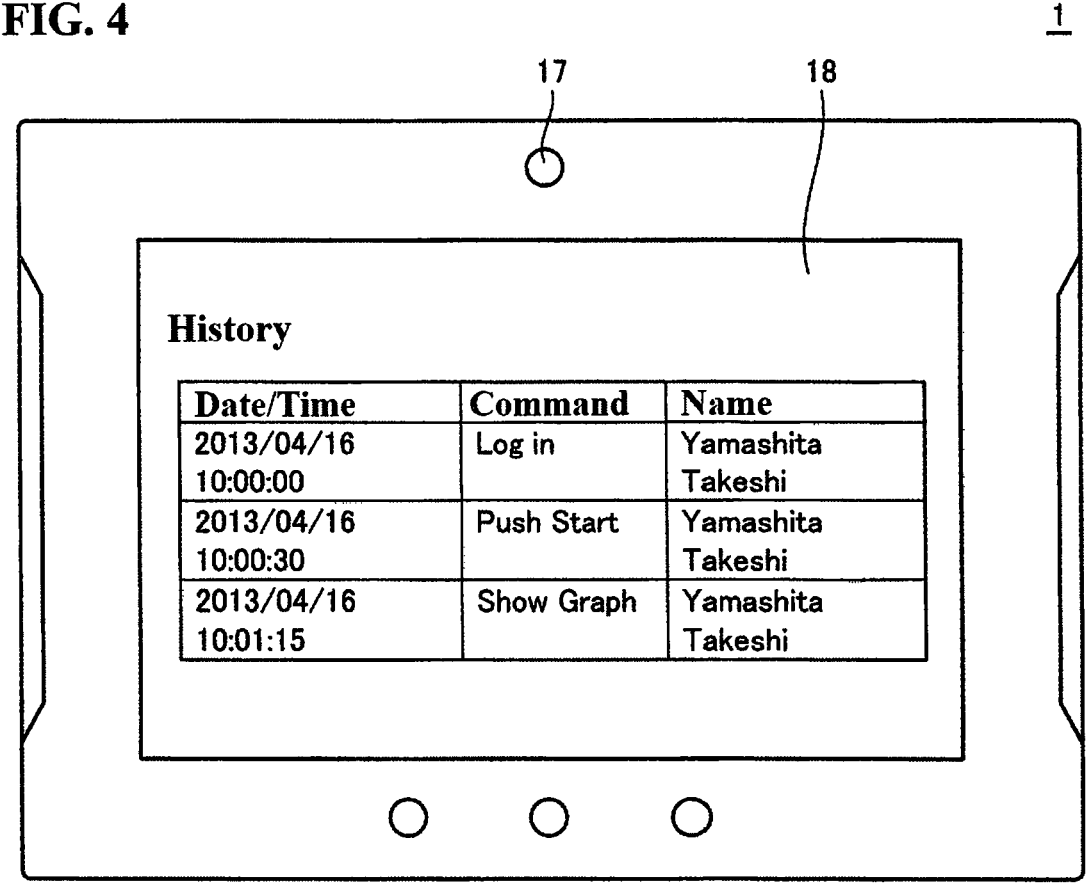
FIG. 4 is a diagram illustrating a history of processing of the display apparatus.

FIG. 4 is a diagram illustrating a history of processing of the display apparatus 1. Referring to FIG. 4, if processing based on a predetermined command has been executed, the display apparatus 1 records the time, the command, and the name of a user who has caused the display apparatus 1 to start the processing (a user who has been authenticated through facial authentication) in association with one another as a history. This history includes a history related to login and logout, and an operation history of the user in a login state.

For example, in one aspect, the display apparatus 1 stores at least identification information (name) of the user who has been authenticated through facial authentication, and a history indicating that access to the application has been permitted (that is to say, transition to a login state in which the user is logged in, i.e., "Log in"), in association with each other. In one aspect, if an operation for designating an image of an operation button included in a user screen is performed in the login state, the display apparatus 1 stores the identification information of the user who has been authenticated through facial authentication, and a history of the operation corresponding to the designated operation button (for example, "Push Start" and "Show Graph"), in association with each other.

The user of the display apparatus 1 (for example, an administrator or later-described maintenance personnel) can confirm the stored history, as shown in FIG. 4, by instructing the display apparatus 1 to display the history on the display. That is to say, the user can perform post-hoc authentication of a user who has logged in through facial authentication.

The following describes a specific configuration of the display apparatus 1 for realizing the above-described processing, and the details of processing other than the above-described processing.

<C. Hardware Configuration>

Figure 5:
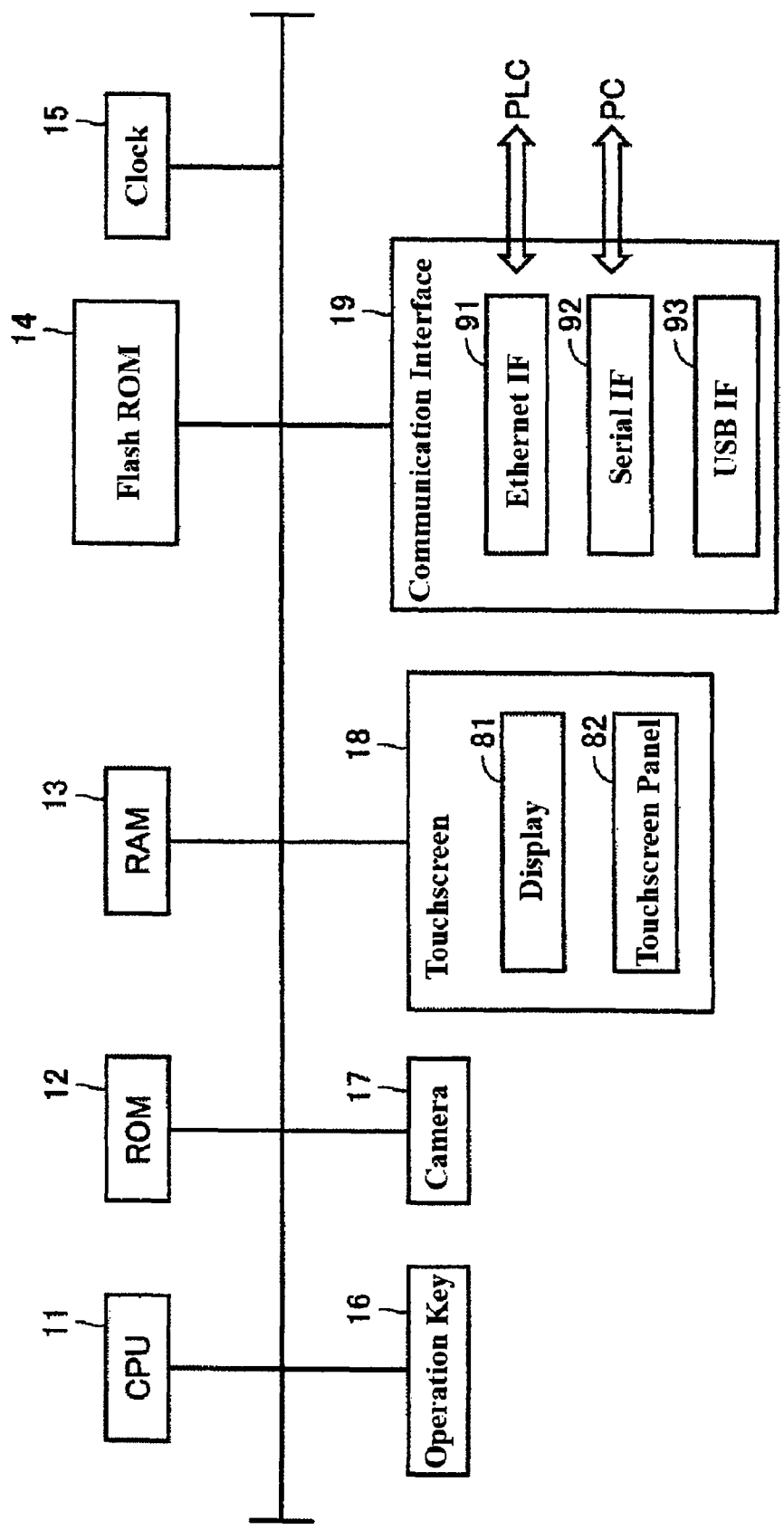
FIG. 5 is a diagram illustrating an example of a hardware configuration of the display apparatus.

FIG. 5 is a diagram illustrating an example of a hardware configuration of the display apparatus 1. Referring to FIG. 5, the display apparatus 1 includes a CPU (central processing unit) 11 that executes various calculations, a ROM (read-only memory) 12, a RAM (random-access memory) 13, a flash ROM 14 that stores various programs in a non-volatile manner, a clock 15, the operation keys 16, the camera 17, the touchscreen 18, and a communication interface 19. These elements are connected to one another via an internal bus.

The touchscreen 18 includes a display 81 and a touchscreen panel 82 that is arranged to cover the display 81. The communication interface 19 includes an Ethernet (registered trademark) IF (interface) 91, a serial IF 92, and a USB (universal serial bus) IF 93.

The CPU 11 deploys the programs stored in the flash ROM 14 into the RAM 13 and the like, and executes the deployed programs. The ROM 12 generally stores programs such as an operating system (OS). The RAM 13 is a volatile memory and used as a working memory.

The Ethernet IF 91 supports Ethernet communication protocols and performs data communication with the PLC. The serial IF 92 supports serial communication protocols and performs data communication with, for example, a PC (personal computer). The USB IF 93 supports USB communication protocols and performs data communication with, for example, a USB memory.

The constituent elements of the display apparatus 1 shown in FIG. 5 are common. Therefore, it can be said that the essential part of the invention is software stored in a memory such as the flash ROM 14, or software that can be downloaded over a network. As the operations of hardware items of the display apparatus 1 are widely known, a detailed description thereof is not repeated.

<D. Details of Processing>

Figure 6:
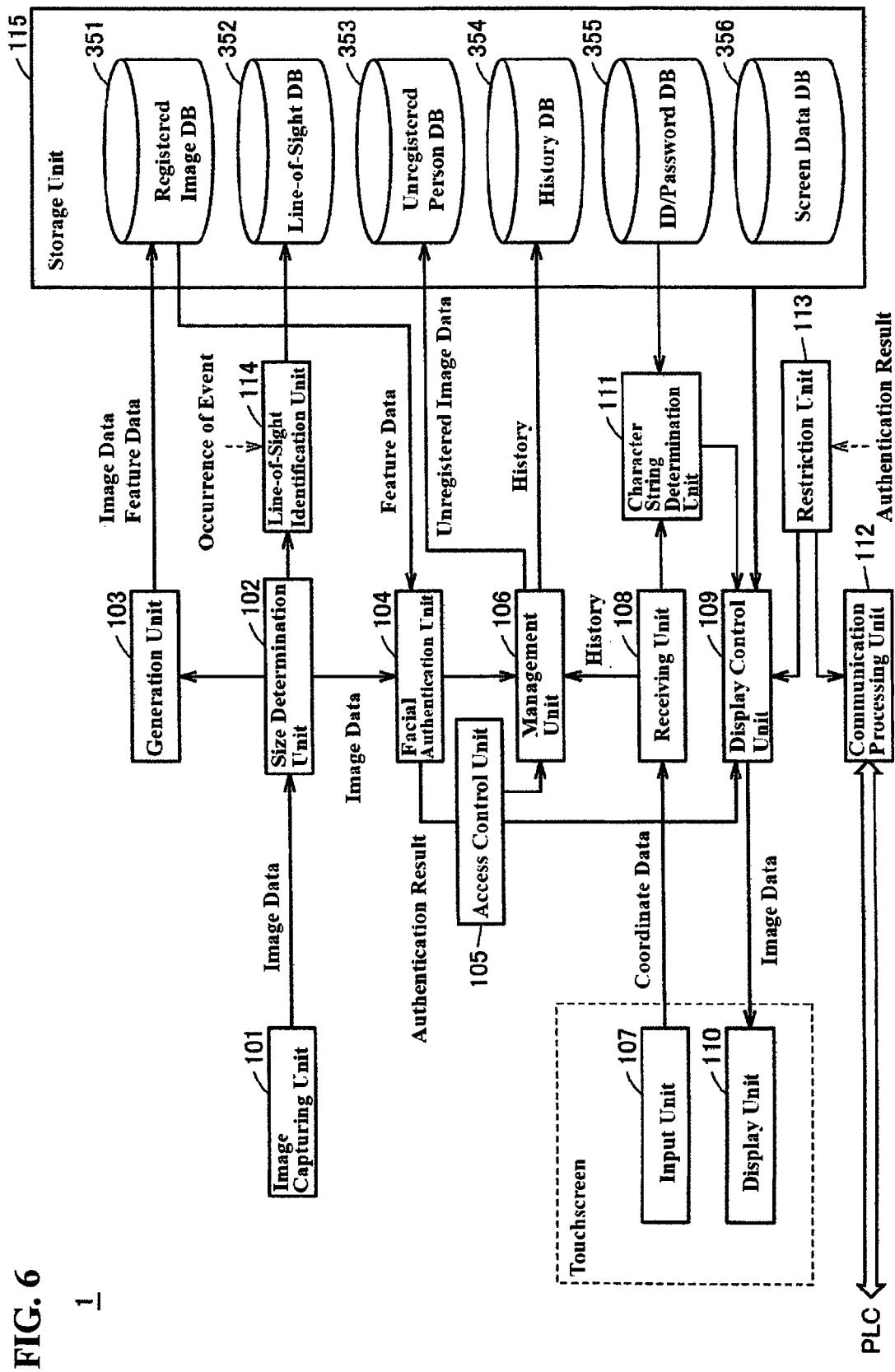
FIG. 6 is a functional block diagram showing a functional configuration of the display apparatus.

FIG. 6 is a functional block diagram showing a functional configuration of the display apparatus 1. Referring to FIG. 6, the display apparatus 1 includes an image capturing unit 101, a size determination unit 102, a generation unit 103, a facial authentication unit 104, an access control unit 105, a management unit 106, an input unit 107, a receiving unit 108, a display control unit 109, a display unit 110, a character string determination unit 111, a communication processing unit 112, a restriction unit 113, a line-of-sight identification unit 114, and a storage unit 115.

The image capturing unit 101 corresponds to the camera 17 shown e.g. in FIG. 5. The input unit 107 corresponds to the touchscreen panel 82. The display unit 110 corresponds to the display 81. The storage unit 115 corresponds to the flash ROM 14 and the ROM 12.

The storage unit 115 includes a registered image DB (database) 351, a line-of-sight DB 352, an unregistered person DB 353, a history DB 354, an ID (identification)/password DB 355, and a screen data DB 356.

Identification information of a user, facial image data of a face of the user, feature data of the face of the user, and identification information indicating an operation authority over the application (for example, administrator, operator, etc.) are registered in the registered image DB 351 in association with one another. This set of information and data is registered in plurality for a plurality of persons. Specifically, identification information indicating an operation authority is stored in association with the individual pieces of feature data. It should be noted that feature data is generated from facial image data by executing a predetermined application program. As one example, a facial image is registered based on image capture performed using the camera 17.

If a user failed to be authenticated through facial authentication, image data of a face of this person who failed to be authenticated is recorded in the unregistered person DB 353. Various histories of a user (a login history, a logout history, and various operation histories) are recorded in the history DB 354. Screen data for displaying various screens (a user screen and a later-described system setting screen) on the display 81 of the display apparatus 1 is recorded in the screen data DB 356.

Information indicating a direction of a line of sight of a user of the display apparatus 1 is recorded in the line-of-sight DB 352. A configuration involving the use of this line-of-sight DB 352 will be described later (FIG. 16). An ID and a password of a user of the display apparatus 1 are recorded in the ID/password DB 355 on a user-by-user basis. A configuration involving the use of the ID/password DB 355 will also be described later.

The image capturing unit 101 captures a subject, and transmits image data obtained through this image capture (image data of the subject including facial image data) to the size determination unit 102. Typically, the image capturing unit 101 executes image capture processing at designated timings, both in a logout state and in a login state. The date and time of image capture are associated with image data. To be more precise, the image capturing unit 101 performs continuous image capture so as to compare facial image data obtained by performing image capture multiple times with feature data in order to authenticate a user. For the sake of convenience, image data obtained through this continuous image capture is hereinafter referred to as "frame data".

The size determination unit 102 determines whether or not a region of a face included in image data is larger than a predetermined size. To be precise, based on image capture performed by the image capturing unit 101, the size determination unit 102 determines whether or not a region of a face included in a subject is larger than a predetermined size (a later-described minimum value). The size determination unit 102 also transmits the result of determination to the generation unit 103 and the facial authentication unit 104.

The generation unit 103 generates feature data based on facial image data in an operation mode for registering facial image data. The generation unit 103 records facial image data and feature data into the registered image DB in association with each other. Typically, the generation unit 103 records facial image data and feature data into the registered image DB in association with each other if a region of a face included in a subject has been determined to be larger than a predetermined size (a later-described minimum value).

In a logout state (a state in which access to the application is not permitted), the facial authentication unit 104 automatically performs facial authentication when a face of a person approaches the image capturing unit 101 of the display apparatus 1. In a login state also, the facial authentication unit 104 performs facial authentication upon receiving a user operation.

Specifically, the facial authentication unit 104 performs authentication of a user based on image data of the user obtained through image capture (also referred to as "first image data") and on feature data (hereinafter also referred to as "first facial authentication"). To be precise, the facial authentication unit 104 performs facial authentication based on facial image data indicating a face included in a subject and on feature data recorded in the registered image DB. To be more precise, the facial authentication unit 104 authenticates a user by performing facial authentication with respect to each one of a plurality of pieces of frame data.

The facial authentication unit 104 transmits the result of the authentication to the access control unit 105. If a user failed to be authenticated, the facial authentication unit 104 transmits image data of a face that failed to be authenticated (hereinafter also referred to as "unregistered image data") to the management unit 106.

In addition, at designated timings, the facial authentication unit 104 performs authentication of a user based on image data of a face of the user obtained through image capture in a login state (image capture performed while access to the application is permitted) (this image data is also referred to as "second image data"), and on feature data (hereinafter also referred to as "second facial authentication"). The result of this authentication is transmitted to the restriction unit 113.

To be more precise, the facial authentication unit 104 may perform facial authentication with a focus on the eyes. This is because, in venues where the display apparatus 1 is used, there is a high possibility that parts other than the eyes are covered by clothes.

If a user has been authenticated, the access control unit 105 permits the user to access the application. To be precise, the access control unit 105 permits access to the application on the condition that a region of a face has been determined to be larger than a predetermined size.

Specifically, if a user has been authenticated through facial authentication in a logout state, the access control unit 105 switches the state of the display apparatus 1 from the logout state to a login state. To be precise, when permitting access to the application, the access control unit 105 lets the display control unit 109 display a screen (see FIGS. 3A and 3B) on the display 81 (that is to say, the display unit 110) from among a plurality of screens based on feature data of the authenticated user.

If the access control unit 105 has received information indicating a user with the largest size from the facial authentication unit 104, it displays a screen corresponding to this user on the display 81. If the state of the display apparatus 1 has been switched from the logout state to the login state, the access control unit 105 transmits information indicating the transition to the login state to the management unit 106.

To be precise, the access control unit 105 permits access to the application (that is to say, switches from the logout state to the login state) on the condition that the same user has been authenticated with respect to at least a predetermined number of pieces of frame data.

The input unit 107 receives various user operations, such as designation of an object and input of character strings. For example, the input unit 107 receives a touch operation on a user screen. In this case, the input unit 107 transmits coordinate values corresponding to the touch input to the receiving unit 108.

The receiving unit 108 receives the coordinate values from the input unit 107. The receiving unit 108 judges the input instruction (user operation), character strings, and the like based on the received coordinate values and on screen information displayed on the display unit 110. The receiving unit 108 transmits information indicating this user operation to the management unit 106. If the receiving unit 108 receives an ID and a password as the character strings, it transmits the ID and password to the character string determination unit 111.

The display control unit 109 displays a screen on the display 81 (that is to say, the display unit 110). For example, the display control unit 109 displays different screens on the display depending on identification information indicating the above-described operation authority (see FIGS. 3A and 3B). To be precise, the display control unit 109 displays various screens and the like on the display unit 110 in accordance with instructions from various elements.

Specifically, the display control unit 109 displays a user screen (e.g., FIGS. 2A to 3B), a screen for configuring system settings (FIGS. 7A to 7C), a history screen (FIG. 4), and the like on the display unit 110. The display control unit 109 also superimposes a predetermined object image over these screens displayed. The display control unit 109 also displays various types of information (e.g., numeric values and character strings) transmitted from the PLC on the display unit 110.

The management unit 106 stores identification information of the authenticated user and a history indicating transition to a state in which access is permitted into the storage unit 115 in association with each other. Specifically, the management unit 106 stores identification information of the authenticated user and a history indicating that the authenticated user has logged in ("Log in") into the history DB 354 of the storage unit 115 in association with each other. If an operation in which an image of an operation button included in a user screen is designated while access to the application is permitted (in a login state), the management unit 106 stores the identification information of the authenticated user and a history of the operation corresponding to this operation button (e.g., "Push Start" and "Show Graph") into the history DB 354 in association with each other. Any type of history stored in the history DB 354 is associated with date/time information indicating the date and time of execution of processing or operation corresponding to the history.

If the management unit 106 receives unregistered image data from the facial authentication unit 104, it stores the unregistered image data into the unregistered person DB 353. In this case, date/time information indicating the date and time of image capture is associated with the unregistered image data.

To be more precise, the management unit 106 stores the above-described histories into the history DB 354 on the condition that an administrator has configured settings for recording histories. In both of a logout state and a login state, the management unit 106 may or may not store image data of a user who has been authenticated through facial authenticated into the storage unit 115. One of these modes is adopted in accordance with a selection by an administrator.

The communication processing unit 112 executes data processing for communication with the PLC. The restriction unit 113, the character string determination unit 111, and the line-of-sight identification unit 114 will be described later.

Below is a more detailed description of the editing processing and the history recording processing. Default setting processing and switch detection will also be described as processing of the display apparatus 1. The editing processing is processing in which the display control unit 109 displays a user screen corresponding to an authenticated user under control by the access control unit 105 (see FIGS. 3A and 3B). The history recording processing is processing in which the management unit 106 stores unregistered image data and a history into the storage unit 115.

In the following description, for the sake of convenience, it is assumed that three people ("administrator", "maintenance personnel", and "operator") who have different ranges of operation authorities (usage authorities) over the application are defined as users of the display apparatus 1. These ranges of operation authorities decrease in order from the administrator, the maintenance personnel, to the operator.

(d1. Default Setting Processing)

Figure 7B:
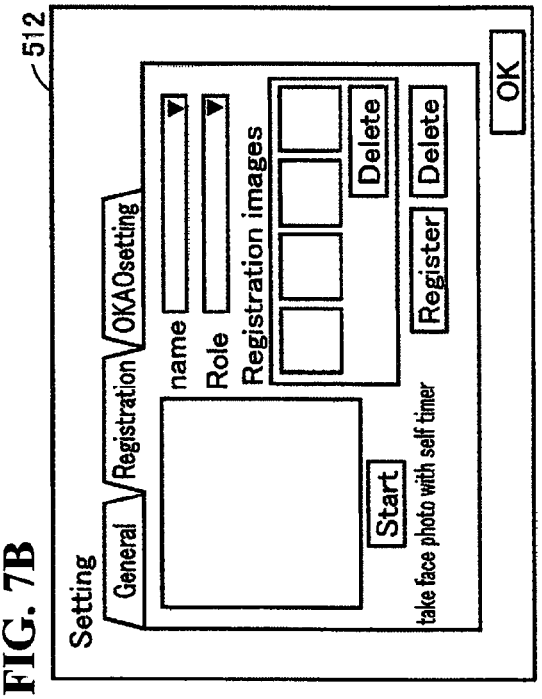
FIGS. 7A to 7C are diagrams illustrating screens for configuring system settings related to facial authentication.
Figure 7A:
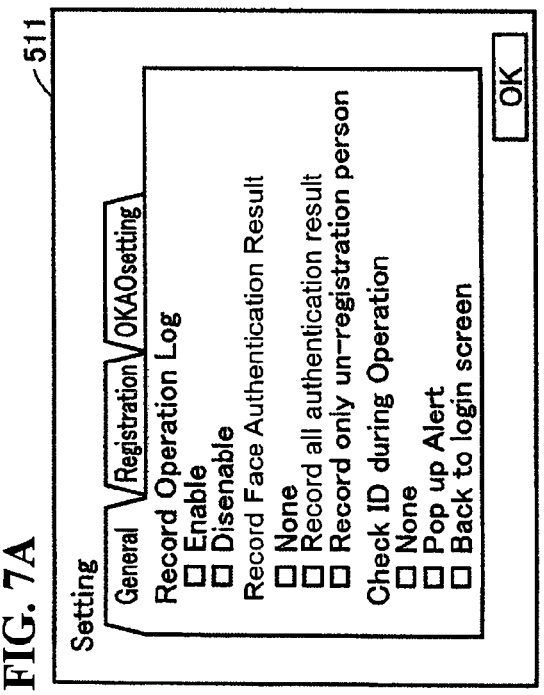
Figure 7C:
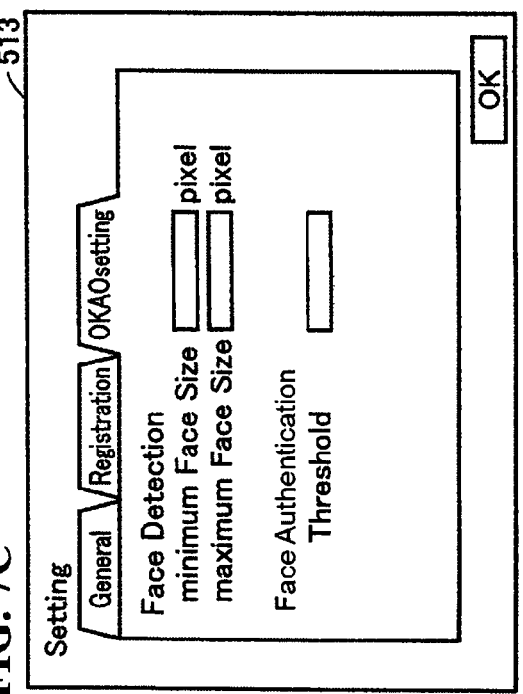

FIGS. 7A to 7C are diagrams illustrating screens for configuring system settings related to facial authentication. FIG. 7A shows a general setting screen 511. FIG. 7B shows a facial authentication setting screen 512. FIG. 7C shows an advanced setting screen 513. Display of these screens for configuring system settings is realized by the display control unit 109 and the display unit 110.

The display apparatus 1 permits only an administrator to configure system settings. That is to say, only a person who is registered in the display apparatus 1 as an administrator can cause display of the screens of FIGS. 7A to 7C.

Referring to FIGS. 7A to 7C, the screens thereof can each be displayed by selecting one of three tabs on the upper part of the screens. The general setting screen 511 shown in FIG. 7A enables setting of whether or not to record a history, setting of whether or not to record facial image data at the time of facial authentication, setting related to detection of switching of people, and setting related to detection of an unregistered person.

The facial authentication setting screen 512 shown in FIG. 7B enables registration of a user who needs to be authenticated through facial authentication, and deletion of the registration of the user. The facial authentication setting screen 512 also enables registration of a plurality of pieces of facial image data of the same person. If a plurality of pieces of facial image data are registered, a plurality of pieces of feature data are generated. One of an administrator, maintenance personnel, and operator is set in the "Role" field.

The advanced setting screen 513 shown in FIG. 7C enables setting of a minimum value and a maximum value of a size of a face included in a subject (person and background) at the time of authorizing login through facial authentication. The advanced setting screen 513 also enables setting of a lower limit value (threshold) for a degree of match at which the identity of a person is confirmed (likelihood of identity) through facial authentication. As one example, 98% may be set as the threshold.

FIG. 8 is a diagram illustrating data stored in the registered image DB 351. Referring to FIG. 8, a name, a role, a date of update of data, facial image data, and feature data are recorded in data D1 in association with one another. As one example, the name "Yamashita Takeshi" is associated with the role "Administrator", the date of update "2012/08/16", three pieces of facial image data ("1023KD", "7544KD", "9118KD"), and three pieces of feature data ("1023TD", "7544TD", "9118TD"). Feature data is generated from facial image data described in the same field. For example, feature data "1023TD" is generated from facial image data "1023KD".

Up to a predetermined number of pieces of facial image data and feature data can be registered (for example, ten pieces each). The facial authentication unit 104 of the display apparatus 1 may be configured to determine that the authentication has been successful (a user has been authenticated) if a degree of match with at least one of the plurality of pieces of feature data is larger than the set lower limit value (threshold). Alternatively, the facial authentication unit 104 may be configured to determine that the authentication has been successful (a user has been authenticated) if the degrees of match with all of the plurality of pieces of feature data are larger than the set lower limit value.

Figure 9C:
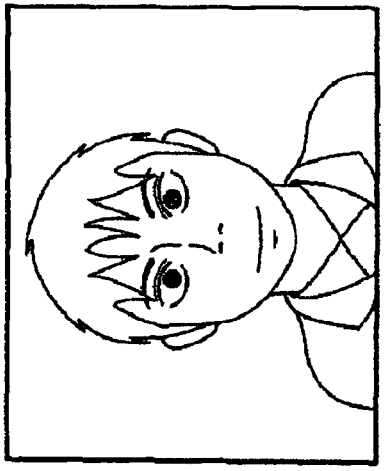
FIGS. 9A to 9C are diagrams illustrating facial image data of FIG. 8.
Figure 9B:
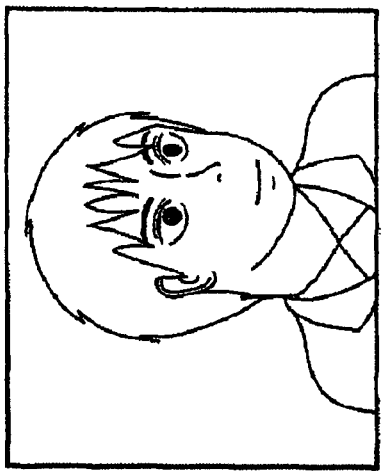
Figure 9A:
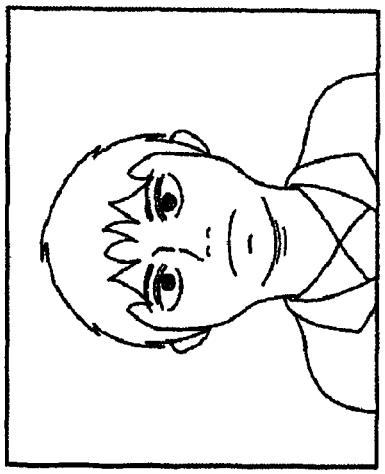

FIGS. 9A to 9C are a diagrams illustrating facial image data of FIG. 8. To be precise, FIG. 9A shows an image based on the first facial image data "1023KD" of "Yamashita Takeshi". FIG. 9B is an image based on the second facial image data "7544KD" of "Yamashita Takeshi". FIG. 9C is an image based on the third facial image data "9118KD" of "Yamashita Takeshi". The accuracy of authentication by the display apparatus 1 can be improved by registering a plurality of pieces of facial image data pertaining to different states and performing facial authentication using these pieces of facial image data in the above-described manner.

(d2. Editing Processing)

Figure 10B:
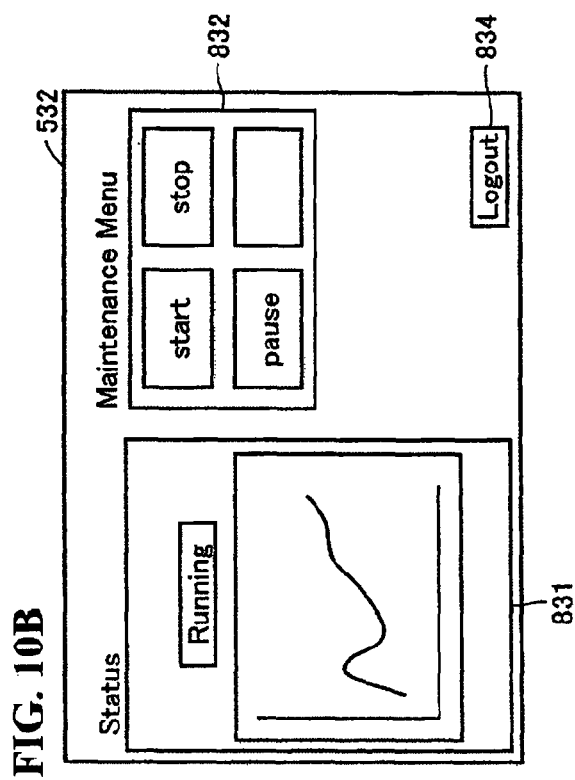
FIGS. 10A to 10C show examples of screens corresponding to authenticated users, which are different from the examples of FIGS. 3A and 3B.
Figure 10A:
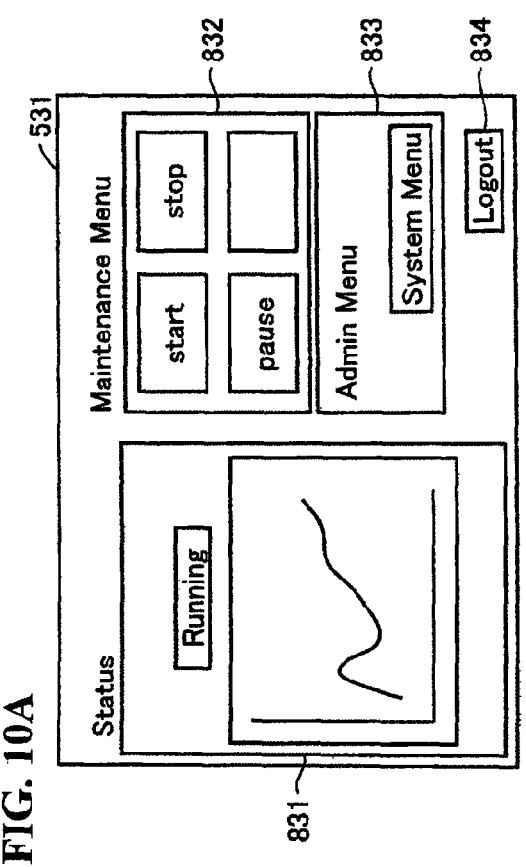
Figure 10C:
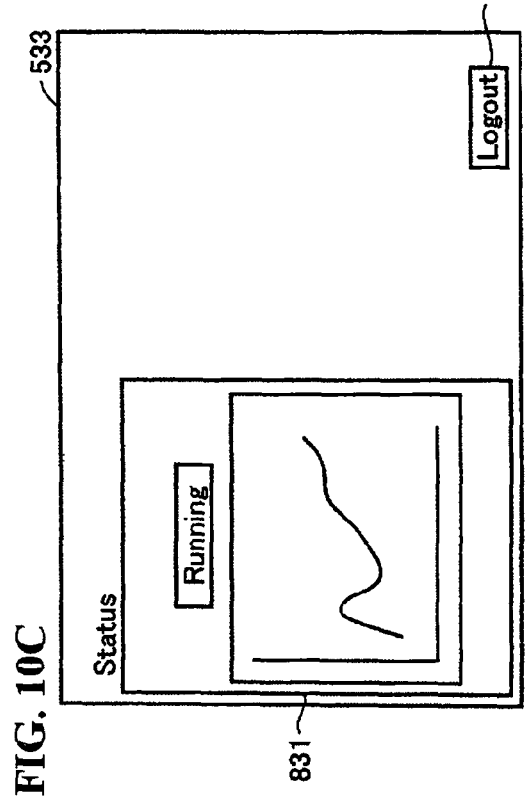

As described above, the display apparatus 1 displays a screen corresponding to a user who has been authenticated through facial authentication. FIGS. 10A to 10C show examples of screens corresponding to authenticated users, which are different from the examples of FIGS. 3A and 3B.

FIG. 10A shows a user screen 531 for an administrator. That is to say, FIG. 10A shows a user screen that is displayed if a user authenticated through facial authentication has been pre-registered as an administrator. FIG. 10B shows a user screen 532 for maintenance personnel. That is to say, FIG. 10B shows a user screen that is displayed if a user authenticated through facial authentication has been pre-registered as maintenance personnel. FIG. 10C shows a user screen 533 for an operator. That is to say, FIG. 10C shows a user screen that is displayed if a user authenticated through facial authentication has been pre-registered as an operator.

Referring to FIG. 10A, the user screen 531 includes a status 831, a maintenance menu 832, an admin menu 833, and an object 834 for logout.

Referring to FIG. 10B, the user screen 532 includes the status 831, the maintenance menu 832, and the object 834. Unlike the user screen 531, the user screen 532 does not include the admin menu 833.

Referring to FIG. 10C, the user screen 533 includes the status 831 and the object 834. Unlike the user screen 531, the user screen 533 does not include the admin menu 833 and the maintenance menu 832.

In this way, the display apparatus 1 displays a user screen corresponding to an operation authority based on the result of facial authentication.

FIG. 11 shows data D3 that is referred to when displaying the user screens 531, 532, 533 of FIG. 10. Referring to FIG. 11, an object name, coordinate information, and information indicating whether or not to display an object image on a role-by-role basis are associated with one another in the data D3. For example, the data D3 indicates that three object images for a start button, a stop button, and a pause button are displayed for an administrator and maintenance personnel. The data D3 also indicates that an object image for a system menu is displayed for an administrator, and an object image for logout is displayed for all users.

The coordinate information is used when displaying an object image on the display 81. The coordinate information defines coordinates of an upper left portion of the object image, as well as the width and height of the object image.

(d3. History Recording Processing)

FIG. 12 shows history data D5 managed by the management unit 106. That is to say, FIG. 12 shows history data D5 stored in the history DB 354. Referring to FIG. 12, the date and time, a command, and a name are recorded in the history data D5 in association with one another. If the display apparatus 1 receives an instruction for displaying the history data D5 from a user (e.g., an administrator), it displays the screen shown in FIG. 4.

FIG. 13 shows data D7 stored in the unregistered person DB 353. Referring to FIG. 13, an image of a person who failed to be authenticated as a user through facial authentication (an image of an unregistered person) is associated with the date and time of image capture in the data D7.

For example, if an operator performs input to the display apparatus 1 to confirm unregistered people, the display apparatus 1 displays images of the unregistered people on the display 81 with reference to the data D7.

(d4. Switch Detection)

A description is now given of switch detection. In the case where the display apparatus 1 is in a login state after a certain person has been facially authenticated, the display apparatus 1 may detect a person who is different from the certain person by performing facial authentication again. This detection is referred to as switch detection.

As described above, even in a login state, the facial authentication unit 104 performs facial authentication at designated timings based on image data of a face obtained through image capture in the login state and on feature data.

The restriction unit 113 restricts execution of processing of the application if a user who has been authenticated through the above-described first facial authentication is different from a user who has been authenticated through the above-described second facial authentication. The restriction unit 113 also restricts execution of processing of the application if a user has not been authenticated through the second facial authentication. Specifically, the restriction unit 113 restricts execution of predetermined processing that is authorized in a login state if the result of facial authentication in a login state does not indicate a user who was authenticated through facial authentication in a logout state, or if a user was not authenticated through facial authentication in a login state.

For example, assume that image capture and authentication are performed for a non-administrator standing in front of the display apparatus 1 while the user screen 531 for an administrator is displayed (FIG. 10A). In this case, the restriction unit 113 restricts at least execution of processing that is allowed in a login state. It is preferable that the restriction unit 113 does not receive selection of an object image that was displayed in the login state.

Figure 14A:
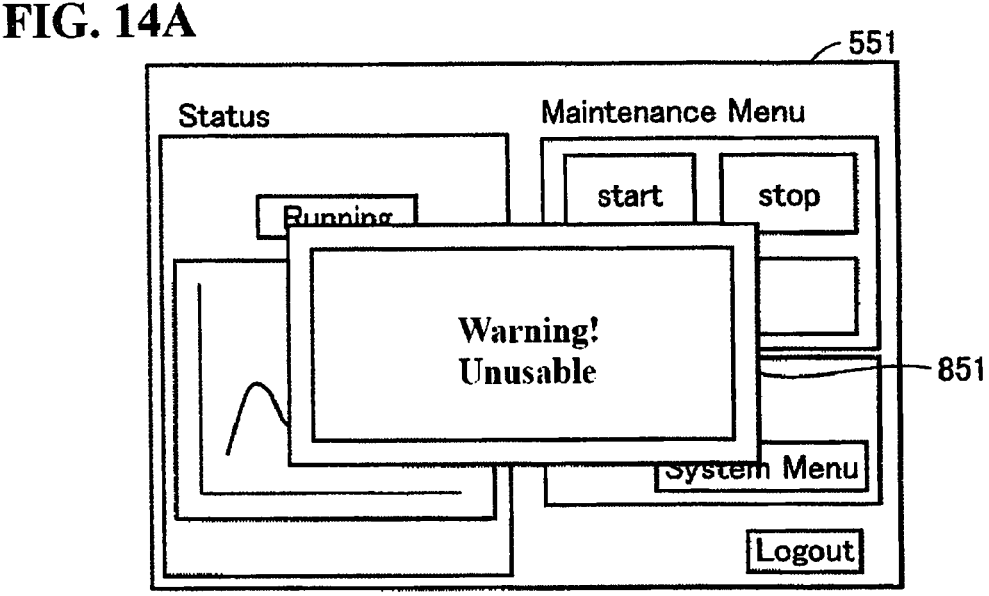
FIGS. 14A and 14B show screens displayed when processing is restricted by a restriction unit.
Figure 14B:
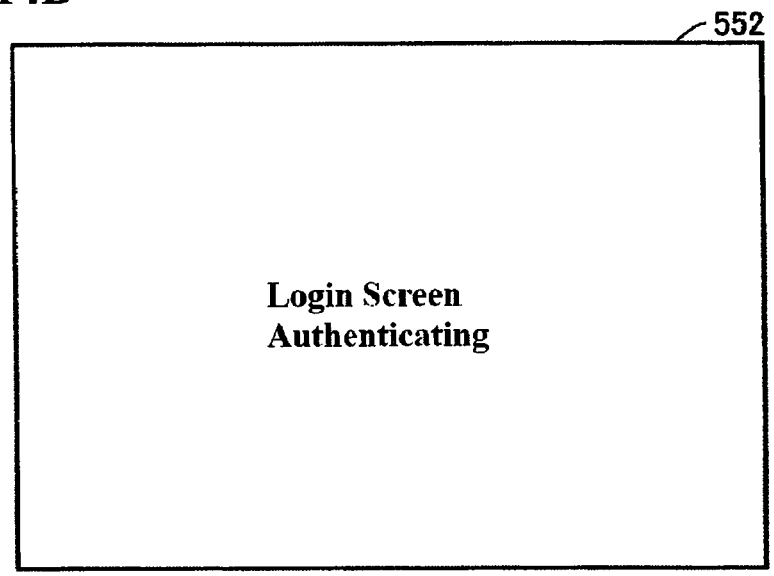

FIGS. 14A and 14B show screens displayed when processing is restricted by the restriction unit 113. FIG. 14A shows a screen on which warning is displayed. FIG. 14B shows a screen after transition from a login state to a logout state. Whether to display the screen shown in FIG. 14A or the screen shown in FIG. 14B is set in the display apparatus 1 in advance. This setting can be changed by an administrator.

Referring to FIG. 14A, when the execution of processing of the application is restricted, the access control unit 105 lets the display control unit 109 display a predetermined object image on the display 81 (display unit 110) such that the predetermined object image is superimposed over a screen that is displayed while access is permitted (in a login state). In this way, the display control unit 109 displays a screen 551, which is composed of the user screen 531 shown in FIG. 11 and a warning object image superimposed thereover, on the display unit 110.

Referring to FIG. 14B, the access control unit 105 switches the state of the display apparatus 1 from a login state to a logout state. Consequently, when the execution of processing of the application is restricted, the display control unit 109 displays, on the display 81, a screen for a state in which access is not permitted in place of a screen displayed while the access is permitted. Specifically, the display control unit 109 displays a screen for a logout state on the display unit 110. In this case, the display apparatus 1 executes image capture and facial authentication processing in a logout state.

While the above is an explanation of an exemplary configuration for causing transition from a user screen to another screen when processing is restricted by the restriction unit 113, no limitation is intended in this regard. For example, the display apparatus 1 may restrict only processing without causing transition of a screen. Settings for this mode are designated by an administrator.

If the result of facial authentication in a login state does not indicate a user who was authenticated through facial authentication in a logout state, the display apparatus 1 may display a user screen corresponding to an operation authority of a user who was authenticated in the login state. For example, if an operator is authenticated through facial authentication in the state of the user screen 531 for an administrator (FIG. 10A), the display apparatus 1 may display the user screen 533 for an operator (FIG. 10C). On the other hand, if a different administrator is authenticated through facial authentication, the state of the user screen 531 may be maintained without restricting an operation authority of the administrator.

<E. Configuration for Control>

Figure 15:
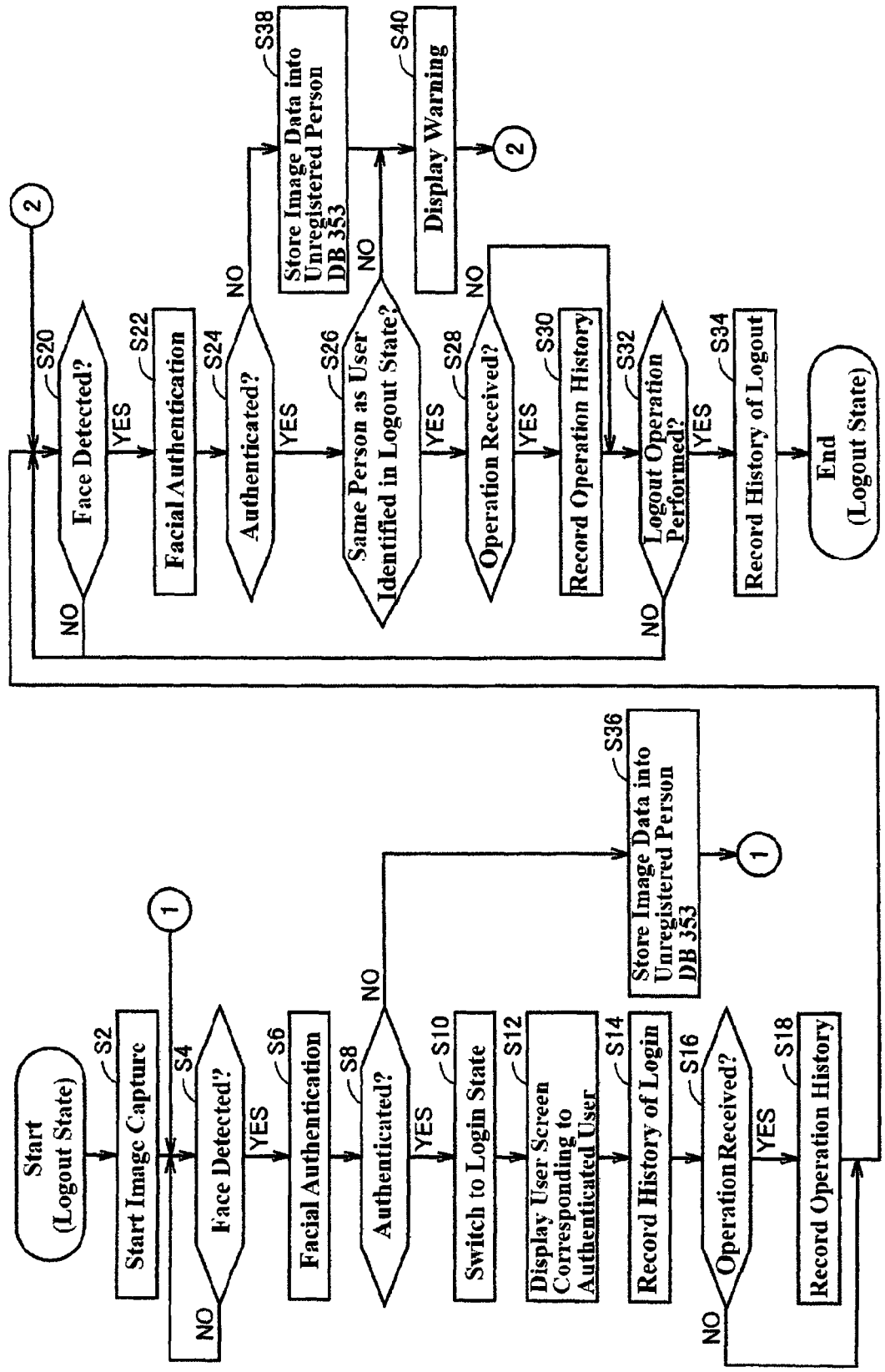
FIG. 15 is a flowchart illustrating the flow of processing of the display apparatus.

FIG. 15 is a flowchart illustrating the flow of processing of the display apparatus 1. Specifically, FIG. 15 shows an aspect of transition from a state in which access to the application is not permitted (a logout state) to a state in which the access is permitted (a login state), and then to a state in which the access is not permitted (the logout state).

Referring to FIG. 15, in step S2, the display apparatus 1 starts image capture following an activation. In step S4, the display apparatus 1 judges whether or not a face has been detected based on image data of a subject obtained through the image capture. If the display apparatus 1 judges that a face has been detected (YES in step S4), it performs facial authentication in step S6. If the display apparatus 1 judges that no face has been detected (NO in step S4), processing proceeds to step S4.

In step S8, the display apparatus 1 judges whether or not a user has been authenticated through facial authentication. If the display apparatus 1 judges that the user has been authenticated (YES in step S8), the state of the display apparatus 1 is switched from a logout state to a login state in step S10. That is to say, the display apparatus 1 permits access to the application. If the display apparatus 1 judges that the user has failed to be authenticated (NO in step S8), it stores the image data into the unregistered person DB 353 in step S36.

In step S12, the display apparatus 1 displays a user screen corresponding to the authenticated user. In step S14, the display apparatus 1 records a history indicating that the authenticated user has logged in into the history DB 354 in association with the time and the name of the authenticated user. That is to say, the display apparatus 1 records a history indicating that access to the application has been permitted in association with the time and the name of the authenticated user. In step S16, the display apparatus 1 judges whether or not an operation on the user screen has been received. Typically, the display apparatus 1 judges whether or not an object image has been selected.

If the display apparatus 1 judges that an operation has been received (YES in step S16), it stores a history record of this operation into the history DB 354 in association with the time at which this operation was performed and the name of the authenticated user in step S18. If the display apparatus 1 judges that no operation has been received (NO in step S16), processing proceeds to step S20.

In step S20, the display apparatus 1 judges whether or not a face has been detected based on image data of a subject obtained through image capture. If the display apparatus 1 judges that a face has been detected (YES in step S20), it performs facial authentication in step S22. If the display apparatus 1 judges that no face has been detected (NO in step S20), processing proceeds to step S20.

In step S24, the display apparatus 1 judges whether or not a user has been authenticated through facial authentication. If the display apparatus 1 judges that a user has been authenticated (YES in step S24), it judges in step S26 whether or not the authenticated user is the same person as the user who was authenticated in the logout state before the login. If the display apparatus 1 judges that the user failed to be authenticated (NO in step S24), it stores the image data into the unregistered person DB 353 in step S38. In step S40, as one example, the display apparatus 1 displays a warning (FIG. 14A).

If the display apparatus 1 judges that the authenticated user is the same person (YES in step S26), the display apparatus 1 judges in step S28 whether or not an operation has been received on the user screen. If the display apparatus 1 judges that the authenticated user is not the same person (NO in step S26), processing proceeds to step S40.

If the display apparatus 1 judges that an operation has been received (YES in step S28), it stores a history record of this operation into the history DB 354 in association with the time at which this operation was performed and the name of the authenticated user in step S30. If the display apparatus 1 judges that no operation has been received (NO in step S28), processing proceeds to step S32.

In step S32, the display apparatus 1 judges whether or not an operation for logout has been received. If the display apparatus 1 judges that no operation for logout has been received (NO in step S32), processing proceeds to step S20. If the display apparatus 1 judges that the operation for logout has been received (YES in step S32), it stores a history record of this operation into the history DB 354 in association with the time at which this operation was performed and the name of the authenticated user in step S34. The display apparatus 1 accordingly returns to the logout state, and then ends the processing sequence.

<F. Modification Examples>

(f1. Modification Example of Editing Processing)

The above is an explanation of a configuration in which the display apparatus 1 displays a screen corresponding to a user who has been authenticated through facial authentication. Specifically, the above is an explanation of a configuration in which the display apparatus 1 displays a screen based on an operation authority of an authenticated user (an operation authority of an administrator, an operation authority of maintenance personnel, and an operation authority of an operator). The following describes a configuration for displaying a screen based on such an operation authority and on various types of information related to an authenticated user.

FIG. 16 is a diagram illustrating data stored in the registered image DB 351 in place of the data D1 shown in FIG. 8. Referring to FIG. 16, a name, a role, a date of update of data, facial image data, feature data, and data defining a display mode (age data, gender data, nationality data, and handedness data) are recorded in data D9 in association with one another. The data D9 differs from the data D1 shown in FIG. 8 in including data defining a display mode.

The display apparatus 1 displays a screen based on an operation authority and on data defining a display mode. For example, if a user has been authenticated as "Yamashita Takeshi" through facial authentication, a screen for an administrator is displayed such that the language contained in the screen is Japanese. The display apparatus 1 also adjusts the size of characters, the brightness of the screen, the contrast of the screen, and the like to age-appropriate values. At this time, out of an arrangement of object images (menu and operation buttons) for left-handedness and an arrangement of object images for right-handedness, the display apparatus 1 displays the screen with the arrangement for right-handedness.

On the other hand, if a user has been authenticated as "Oliver Williams" through facial authentication, a screen for maintenance personnel is displayed such that the language contained in the screen is English. The display apparatus 1 also adjusts the size of characters, the brightness of the screen, the contrast of the screen, and the like to age-appropriate values. At this time, the display apparatus 1 displays the screen with an arrangement for right-handedness. In addition, from among a plurality of screens for maintenance personnel, the display apparatus 1 displays a screen for maintenance personnel that has been prepared in advance for females.

In this way, in the display apparatus 1, a plurality of pieces of feature data are individually associated with information defining a display mode of a screen. The display control unit 109 of the display apparatus 1 displays a screen corresponding to an authenticated user on the display unit 110 in a display mode defined by information associated with feature data of the authenticated user. Therefore, the display apparatus 1 can display a screen customized for a user authenticated through facial authentication.

As described above, the display mode includes at least one of the language and the character size. Therefore, the display apparatus 1 can display a screen in accordance with the display language and the character size that are considered to be appropriate for the authenticated user.

Information defining a display mode of a screen includes at least one of the age, gender, and nationality. By using such information, the display apparatus 1 can display a screen appropriate for a user who has been authenticated through facial authentication.

(f2. Processing Related to Line of Sight)

Figure 17:
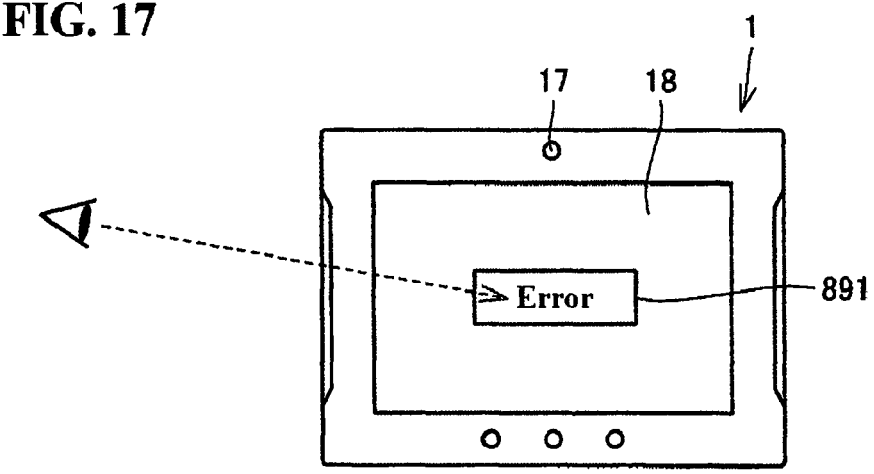
FIG. 17 is a diagram illustrating a configuration for detecting a line-of-sight direction of a user.

FIG. 17 is a diagram illustrating a configuration for detecting a line-of-sight direction of a user. Referring to FIG. 17, upon the occurrence of a predetermined event in a login state, the display apparatus 1 displays a predetermined object 891 corresponding to the event.

If image data of a face is included in image data of a user that was obtained through image capture while access to the application was permitted (in a login state), the line-of-sight identification unit 114 of the display apparatus 1 (see FIG. 6) identifies a direction of a line of sight of the face. In this case, the management unit 106 stores a direction of a line of sight at the time of the occurrence of the predetermined event into the line-of-sight DB 352 of the storage unit 115 in association with the event. A direction of a line of sight can be identified by considering the size of the face (the size of the eyes) included in the captured image data, as well as the positions of irides (or pupils) in the face.

Therefore, by confirming data in the line-of-sight DB 352, an administrator and the like who has logged in can judge whether or not a person, e.g., an operator who was working at a venue at the time of the occurrence of a predetermined event was looking at a screen of the display apparatus 1 at the time of the occurrence of the event.

(f3. Facial Authentication Processing for Plurality of Persons)

The above is an explanation of an exemplary case in which an image obtained through single image capture shows a single person. The following describes processing for a case in which an image obtained through single image capture shows a plurality of persons.

Figure 18:
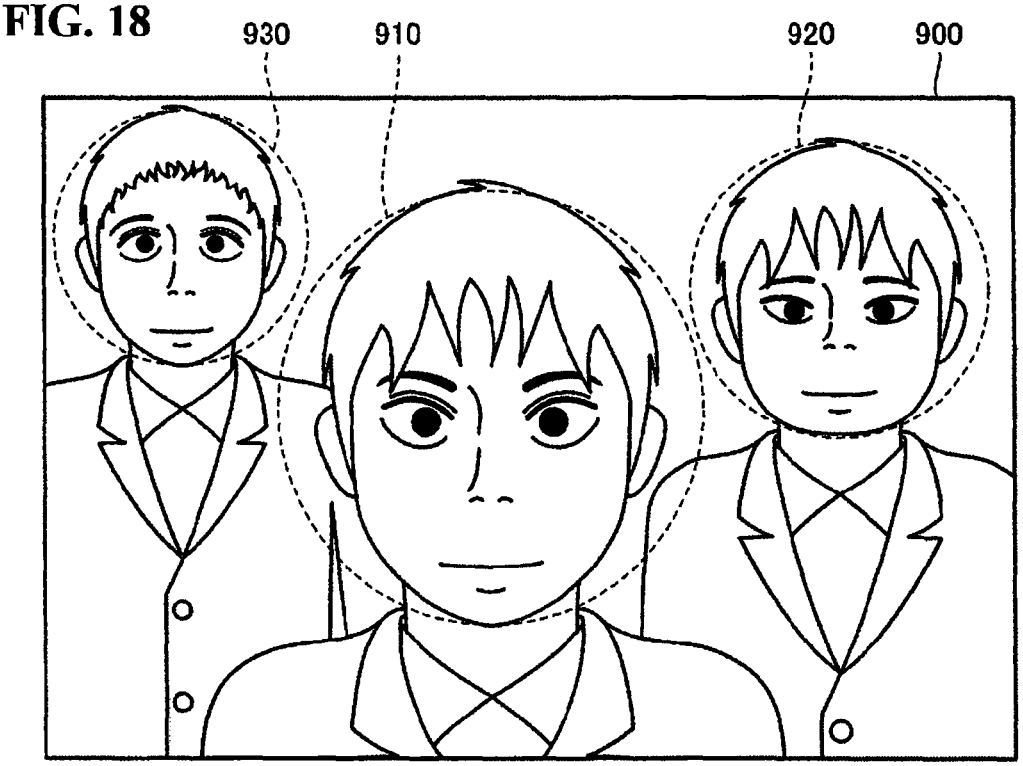
FIG. 18 shows a state in which a plurality of users are included in image data of a subject obtained through image capture using a camera.

FIG. 18 shows a state in which a plurality of users are included in image data of a subject obtained through image capture using the camera 17. Referring to FIG. 18, a person 910 is shown foremost in an image. A person 920 and a person 930 are shown in this order behind the person 910. Therefore, the size of a facial region decreases in order of the person 910, the person 920, and the person 930.

If the image capturing unit 101 has transmitted image data that has been obtained through single image capture and shows a plurality of persons, the size determination unit 102 determines whether or not the people's respective facial regions are larger than a predetermined size. In the case of FIG. 18, the size determination unit 102 determines whether or not the facial regions of the person 910, person 920, and person 930 are larger than a predetermined size.

If the facial authentication unit 104 receives, from the size determination unit 102, the image data that has been obtained through single image capture and shows a plurality of persons together with the result of the foregoing determination, the facial authentication unit 104 performs facial authentication for the plurality of persons. In this case, the facial authentication unit 104 transmits at least identification information of one of the authenticated users with the largest size to the access control unit 105. For example, in the case of FIG. 18, the facial authentication unit 104 transmits identification information (typically, a name) of the person 910 to the access control unit 105.

If image data obtained through image capture includes a plurality of users, the management unit 106 stores, in association with each other, identification information of those of the users whose facial region has been determined to be larger than a predetermined size (lower limit value), and a history record indicating that access to the application has been permitted (that is to say, the user has logged in), into the history DB 354 of the storage unit 115. For example, in the case of FIG. 18, the management unit 106 stores identification information of the person 910, together with a history record indicating that the person 910 has logged in, into the history DB 354 in association with each other.

The management unit 106 also stores, into the storage unit 115, identification information of those users other than the user(s) whose facial region has been determined to be larger than the predetermined size. For example, in the case of FIG. 18, the management unit 106 stores user information of the person 920 and user information of the person 930 into the storage unit 115.

In this way, a user of the display apparatus 1 (e.g., an administrator) can identify, from identification information, who was present around a person who logged in when the state of the display apparatus 1 switched from a logout state to a login state (in the case of FIG. 18, the person 910). In the example of FIG. 18, an administrator can identify a name of the person 920 and a name of the person 930.

The management unit 106 further stores, into the storage unit 115, image data of any not authenticated users among users other than those whose facial region has been determined to be larger than the predetermined size. For example, in the case of FIG. 18, if the facial authentication unit 104 judges that the person 930 is an unregistered person, the management unit 106 stores image data of the person 930 into the storage unit 115.

In this way, a user of the display apparatus 1 (e.g., an administrator) can confirm the face of any unregistered person who was present around a person who logged in when the state of the display apparatus 1 switched from a logout state to a login state (in the case of FIG. 18, the person 910).

(f4. Use of ID and Password)

A description is now given of a configuration involving the use of an ID and a password. The display apparatus 1 may be configured to permit an administrator and maintenance personnel, who have a broader operation authority than an operator, to access the application (switch the state of the display apparatus 1 from a logout state to a login state) on the condition that the administrator and maintenance personnel have been authenticated as users through facial authentication and their IDs and passwords have matched for the purpose of logging in. The following is a detailed description of this processing.

If a user who has been authenticated through facial authentication has an operation authority of an administrator or maintenance personnel, the receiving unit 108 receives input of an ID and a password, which are character strings. The character string determination unit 111 determines whether or not the ID and password received by the receiving unit 108 match an ID and a password pre-registered in the ID/password DB 355 (predetermined character strings). The access control unit 105 switches the state of the display apparatus 1 from a logout state to a login state on the condition that the character string determination unit 111 has determined that the ID and password match.

With the foregoing configuration, security can be improved compared to a configuration for permitting login only through facial authentication regardless of a range of operation authorities. While the above is an explanation of an exemplary configuration in which an administrator and maintenance personnel are requested to input an ID and a password, a configuration for requesting only an administrator to input an ID and a password may be adopted. Also, the display apparatus 1 may be configured to request input of only one of an ID and a password.

f4. Configuration without Built-in Camera

While the above is an explanation of an exemplary configuration in which the display apparatus has a built-in camera, no limitation is intended in this regard. The display apparatus may be configured to communicate with an external camera. That is to say, the display apparatus 1 may be configured to obtain image data from the external camera.

(f5. Operation Authority)

While the above has exemplarily described an administrator, maintenance personnel, and operator who respectively have three different operation authorities, no limitation is intended in this regard. The number of types (categories) of operation authorities may be two, and may be four or more.

(f6. Application to Apparatus Other than Programmable Display Apparatus)

The above is an explanation of the programmable display apparatus (display apparatus 1) as an example. However, various types of processing described above are applicable not only to the programmable display apparatus, but also to a monitor (display apparatus) including the programmable display apparatus.

The embodiment disclosed herein is to be considered in all respects as illustrative, and not restrictive. The scope of the invention is indicated by the claims, rather than by the above description, and is intended to embrace all changes that come within the meaning and scope of equivalency of the claims.

LIST OF REFERENCE NUMERALS 1 display apparatus
11 CPU
12 ROM
13 RAM
14 flash ROM
15 clock
16 operation key
17 camera
18 touchscreen
19 communication interface
81 display
82 touchscreen panel
101 image capturing unit
102 size determination unit
103 generation unit
104 facial authentication unit
105 access control unit
106 management unit
107 input unit
108 receiving unit
109 display control unit
110 display unit
111 character string determination unit
112 communication processing unit
113 restriction unit
114 line-of-sight identification unit 115 storage unit
511 general setting screen
512 facial authentication setting screen
513 advanced setting screen
531, 531, 532, 533, 532, 533 user screen
801, 802, 803, 804, 834, 891 object
831 status
832 maintenance menu
833 admin menu
910, 920, 930 person
351 registered image DB
352 line-of-sight DB
353 unregistered person DB
354 history DB
355 ID/password DB
356 screen data DB

The invention claimed is:

1. A programmable display apparatus for controlling access to an application, comprising:
a display;
a camera;
a display control unit that causes a screen to be displayed on the display;
a storage unit that stores feature data of faces of a plurality of users and screen data for displaying a plurality of screens;
an authentication unit that performs facial authentication of a subject based on image data of a face of the subject obtained through an image capture operation of the face of the subject captured by the camera and based on the stored feature data of the faces of the plurality of users; and
an access control unit that permits access to the application by the subject if the subject has been authenticated by the authentication unit,
wherein:
upon permitting the access, the access control unit causes the display control unit to display on the display the screen from among the plurality of screens based on feature data that corresponds to the authenticated subject; and
upon failing to be authenticated by the authentication unit through facial recognition, image data of the face of the subject that failed to be authenticated is recorded in an unregistered person database stored in the storage unit.

2. The programmable display apparatus according to claim 1,
wherein the storage unit stores the feature data in form of a plurality of pieces of the feature data,
identification information indicating an operation authority is stored in association with the plurality of pieces of the feature data, and
the display control unit displays different screens on the display depending on the identification information.

3. The programmable display apparatus according to claim 2,
wherein the plurality of pieces of the feature data are individually associated with information defining a display mode of the screen, and
the display control unit displays the screen from among the plurality of screens corresponding to an identified individual on the display in the display mode defined by information associated with the feature data of the identified individual.

4. The programmable display apparatus according to claim 3,
wherein the display mode includes at least one of a language and a character size.

5. The programmable display apparatus according to claim 4,
wherein the information defining the display mode of the screen includes at least one of age, gender, and nationality.

6. A display control method for a screen displayed on a display of a programmable display apparatus, comprising:
receiving, from a camera, image data of a subject obtained through image capture by the camera of a face of the subject;
performing, by a facial authentication unit, facial authentication of the subject based on stored feature data of a plurality of users, the stored feature data indicating one or more features of a face of an individual;
permitting, by an access control unit, access to an application that runs on the programmable display apparatus if the subject has been authenticated through the facial authentication;
displaying, by a display control unit, on the display a screen of a plurality of screens that corresponds to the authenticated subject; and
recording, in an unregistered person database upon failing to be authenticated by the authentication unit through facial recognition, image data of the face of the subject that failed to be authenticated.

7. The display control method according to claim 6, further comprising:
storing, in a storage unit, the feature data of each of the plurality of users, in form of a plurality of pieces of the feature data;
storing, in the storage unit, identification information of each of the plurality of users indicating an operation authority in association with the individual pieces of feature data; and
displaying, by the display control unit, different ones of the plurality of screens on the display depending on the identification information.

8. The display control method according to claim 7,
wherein the plurality of pieces of the feature data are individually associated with information defining a display mode of the screen, and
wherein the display control method further comprises displaying the screen corresponding to the authenticated subject as an identified individual on the display in the display mode defined by the information individually associated with the feature data of the identified individual.

9. The display control method according to claim 8,
wherein the display mode includes at least one of a language and a character size.

10. The display control method according to claim 8,
wherein the information defining the display mode of the screen includes at least one of age, gender, and nationality.

11. A non-transitory computer readable medium having a processor-executable program for controlling display of a screen on a display of a programmable display apparatus stored thereon, the processor-executable program when executed causing a processor of the programmable display apparatus to perform operations comprising:
receiving image data of a subject obtained through image capture of a face of the subject;

performing facial authentication of the subject based on stored feature data of a plurality of users, the stored feature data indicating one or more features of a face of an individual;

permitting access to an application that runs on the programmable display apparatus if the subject has been authenticated through the facial authentication;

displaying on the display a screen corresponding to the authenticated subject from among a plurality of screens; and recording, in an unregistered person database upon failing to be authenticated by the authentication unit through facial recognition, image data of the face of the subject that failed to be authenticated.

12. The non-transitory computer readable medium according to claim 11, wherein the processor-executable program causes the processor to perform operations further comprising:

storing the feature data of each of the plurality of users, in form of a plurality of pieces of the feature data;

storing identification information of each of the plurality of users indicating an operation authority in association with the individual pieces of feature data; and displaying, by the display control unit, different ones of the plurality of screens on the display depending on the identification information.

13. The non-transitory computer readable medium according to claim 12, wherein the plurality of pieces of the feature data are individually associated with information defining a display mode of the screen, and wherein the display control method further comprises displaying the screen corresponding to the authenticated subject as an identified individual on the display in the display mode defined by the information individually associated with the feature data of the identified individual.

14. The non-transitory computer readable medium according to claim 13, wherein the display mode includes at least one of a language and a character size.

15. The non-transitory computer readable medium according to claim 13, wherein the information defining the display mode of the screen includes at least one of age, gender, and nationality.

* * * * *